United States Patent
Hahn et al.

(10) Patent No.: US 6,224,990 B1
(45) Date of Patent: May 1, 2001

(54) BINDER SYSTEMS FOR POWDER METALLURGY COMPACTS

(75) Inventors: Randolph S. Hahn, Simpsonville; Peter James Fernstrom, Easley; Udaya Shankar Bhimaraja, Greenville; Brian J. Melody, Greer, all of SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/401,996

(22) Filed: Sep. 23, 1999

(51) Int. Cl.$^7$ .................................................. B22F 1/02
(52) U.S. Cl. ..................... 428/553; 419/23; 419/35; 419/64; 419/65; 419/66; 427/212; 427/216; 428/558; 428/539.5; 428/403; 428/407; 428/660; 428/662
(58) Field of Search ...................... 428/553, 558, 428/539.5, 403, 407, 662, 660; 419/23, 35, 64, 65, 66; 427/212, 216

(56) References Cited

U.S. PATENT DOCUMENTS

| | | |
|---|---|---|
| 3,397,057 | 8/1968 | Harrington et al. . |
| 3,585,168 | 6/1971 | Inoue et al. . |
| 3,708,728 * | 1/1973 | Sterling et al. ..................... 428/403 |
| 4,009,007 | 2/1977 | Fry . |
| 4,128,421 | 12/1978 | Marsh et al. . |
| 4,441,927 | 4/1984 | Getz et al. . |
| 4,448,845 | 5/1984 | Jakubowski et al. . |
| 4,665,136 | 5/1987 | Santangelo et al. . |
| 5,321,060 | 6/1994 | Oliver et al. . |
| 5,605,561 | 2/1997 | Iwabuchi et al. . |
| 5,882,802 | 3/1999 | Ostolski . |
| 6,024,914 * | 2/2000 | Yoshida .................................. 419/23 |
| 6,051,326 * | 4/2000 | Fife ...................................... 428/662 |

FOREIGN PATENT DOCUMENTS

| | | |
|---|---|---|
| 0 300 039 | 1/1989 | (EP) . |
| 2-034701 | 2/1990 | (JP) . |
| 5-287304 | 11/1993 | (JP) . |

OTHER PUBLICATIONS

PCT/US00/10927 International Search Report dated Nov. 2000.

* cited by examiner

*Primary Examiner*—Deborah Jones
*Assistant Examiner*—Robert R. Koehler
(74) *Attorney, Agent, or Firm*—Banner & Witcoff, Ltd.

(57) ABSTRACT

The application of polypropylene carbonate in solution to valve metal powders having relatively high surface area, then evaporating the solvent under static (non-agitating) conditions. The static drying of the coated valve metal powder produces a semi-solid cake which may be converted into a free-flowing powder via screening. Valve metal powders so-coated with polypropylene carbonate are particularly well-suited for the fabrication of powder metallurgy anode bodies used for the manufacture of electrolytic capacitors.

20 Claims, No Drawings

BINDER SYSTEMS FOR POWDER METALLURGY COMPACTS

FIELD OF THE INVENTION

The present invention is directed to coating valve metal powder with polypropylene carbonate as a binder/lubricant and use of the coated valve metal powder in manufacturing powder metallurgy compacts such as capacitor anodes.

BACKGROUND OF THE INVENTION

During the past several decades, the use of capacitors formed using valve metal powders has grown exponentially. This increase is mainly due to a large growth in the use of solid tantalum capacitors. Solid tantalum capacitor use has increased due to their high reliability, high capacitance per unit volume, and wide variety of surface-mount configurations available.

Also contributing to the popularity of solid tantalum capacitors is the continuing decrease in cost per unit capacitance for these devices. The reduction in the cost per unit capacitance is, in part, the result of the increasing economy of scale. As ever greater numbers of the devices are manufactured ever more quickly, the fixed costs per capacitor are reduced, thereby fueling the market for these devices. Another very important factor in the continuation of cost reduction for solid tantalum capacitors is the availability of finer, higher surface area tantalum powders. The use of tantalum powders, having greater surface area per unit weight, allows the use of less tantalum powder per device, thereby facilitating a savings in the "contained tantalum" component of device cost.

Unfortunately, as tantalum capacitor powders having higher surface areas per unit weight have come into use, several disadvantages of these finer (i.e. smaller particle size) powders have become apparent. Finer powders exhibit less-than-ideal flow characteristics during the anode pressing process. The generally slower and less even flow characteristics of finer tantalum powders results in less uniform anode weights unless slower machine speeds are employed; this, in turn, makes the anode fabrication process less efficient as fewer parts are produced per unit of time.

The finest particles present in higher surface area capacitor powders tend to become airborne readily during processing on anode presses, necessitating expensive explosion-resistant high air flow rate exhaust systems to prevent injury to workers and to reduce the fire/explosion hazard from airborne dust. The dust from high surface area capacitor powders has also proven to be highly abrasive in contact with the dies, punches, sliding, and rotary bearing surfaces of anode pressing equipment. The presence of the fine dust from high surface area tantalum powders requires the use of more precise punch and die tolerances, cemented carbide tooling in place of hardened steel, and frequent bearing replacement, all of which add to the cost of capacitor anode fabrication with these powders.

The simple expedient of employing a powdered binder/lubricant material, such as ethylene diamine bis d-stearamide (sold under the tradename of "Acrawax", by the Lonza Corporation) in mechanical mixture with the higher surface area capacitor powders imparts lubricity to these powders, minimizing anode press repairs due to wear, but results in very little improvement in flow properties or fine dust generation.

The coating of fine capacitor powders with binder/lubricant via tumbling the powders in a solution of the binder/lubricant (such as a solution of the binder, stearic acid, dissolved in one or more chlorinated solvents and/or acetone), followed by dynamic vacuum-drying of the binder-coated capacitor powder in a Patterson-Kelly V-shell type blender results in a reduction of fine powder dust generation, as well as improved pressing equipment lubrication, but does not address powder flow considerations.

An additional problem is observed with high surface area capacitor powders, such as tantalum having a surface area above about 0.3 square meter per gram, which is that traditional binder/lubricant materials become increasingly more difficult to remove completely. Tantalum powders having a surface area of 0.4–0.5 square meter per gram, mixed with 1% to 5% stearic acid or ACRAWAX (with or without the use of a solvent) and pressed into 0.1 gram anode pellets are frequently found to contain 300 to 400 ppm carbon after a thermal binder removal step in vacuum and 150 to 200+ ppm carbon following the vacuum sintering step used to produce the finished anode bodies prior to electroprocessing (anodizing, counter-electrode fabrication, and encapsulation). The level of carbon remaining in the anode bodies after vacuum-sintering is proportionally higher with progressively finer capacitor powders and larger anode size.

The presence of carbon on the valve metal surfaces within the interstices of the anodes after vacuum sintering leads to the production of anodic oxide having flaws or high electrical leakage regions. These flaws are thought to be due to the presence of spots of tantalum carbide on tantalum anode surfaces; the tantalum carbide is thought to give rise to holes or thin spots in the tantalum oxide film which conduct electricity under the application of voltage (this leakage current mechanism is discussed in Young's 1961 book, *Anodic Oxide Films,* in the chapters dealing with tantalum). Whatever the mechanism, the correlation between elevated levels of carbon in anodes after vacuum sintering and high finished device leakage currents has been empirically established for many years.

SUMMARY OF THE INVENTION

The present invention is directed to a high surface area valve metal powders coated with polypropylene carbonate by tumbling the valve metal powder in a solution of polypropylene carbonate in a suitable solvent, such as acetone, and then statically drying the coated powder. The polypropylene carbonate behaves as a binder/lubricant in the manufacture of powder metallurgy capacitor anodes.

The present invention is further directed to a method of preparing powder metallurgy anodes with compacted coated valve metal powder wherein the coated valve metal powder is prepared by tumbling the valve metal powder in a solution of polypropylene carbonate in a suitable solvent and statically drying the coated powder.

DETAILED DESCRIPTION OF THE INVENTION

It is known to coat valve metal powders such as tantalum powders with polypropylene carbonate and then dry the coated powder using dynamic means, e.g. tumbling in a drier. It was discovered that coating the valve metal powders, in particular tantalum powders, with polypropylene carbonate and then drying the coated powder using static means produces a coated product having better properties. Specifically, the method of drying the polypropylene carbonate-coated valve metal has an unexpected and profound effect upon the suitability of the powder for capacitor anode fabricator.

Valve metal powders coated with polypropylene carbonate using the static drying method of the present invention have higher flow rates and reduced fine dust generation than uncoated powder or powder coated and dynamically dried. This allows the use of higher valve metal capacitor body pressing rates, as well as a reduction in the rate of wear of press components, thereby reducing the cost of anode fabrication. Thus, the polypropylene carbonate-coated powder, prepared in accordance with the invention, is lubricious toward anode press components due to the lubricity of the polymer and the relative absence of "fines" in the powder.

In accordance with the invention, a high surface area valve metal powder is coated with polypropylene carbonate by tumbling the powder in a solution of polypropylene carbonate in a suitable solvent. Then, the coated is dried using static means.

The valve metal powder may be any suitable valve metal powder used in the preparation of powder metallurgy compacts. Such valve metal powders include, but are not limited to, tantalum and niobium powders. Preferably the valve metal powder is tantalum. There is not limit as to the particle size of the powders that can be used in this invention, however the method of the invention is particularly more effective than the prior art in lowering residual carbon levels using particles less than 1 micron.

The polypropylene carbonate is dissolved in a suitable solvent such as, but not limited to, 1,1,1 trichloroethane, acetone, and suitable mixtures thereof. The concentration of the polypropylene carbonate may be any suitable concentration and is typically about 0.5% to about 25%, preferably about 1% to about 10% based on the total weight of solution. The polypropylene carbonate content may also be measured based on the weight of the valve metal employed and is typically between about 0.1% to about 10%, preferably about 0.25% to about 5% based upon the weight of the valve metal.

The polypropylene carbonate may be obtained from any suitable source, such as from PAC Polymers under the name Q-PAC. Polypropylene carbonate thermally decomposes at approximately 250° C. to yield propylene carbonate, propylene oxide, and carbon dioxide, all of which are volatile in vacuum at this temperature. The 250° C. decomposition point of the polymer lies below the temperature range above which high surface area tantalum powders exhibit high reactivity with carbonaceous materials (i.e., above about 280° C. to 300° C.). Polypropylene carbonate was first synthesized by Inoue, et.al. In the late 1960's (U.S. Pat. No. 3,585,168). The technology was expanded by the Air Products Corp. (U.S. Pat. No. 4,665,136) and is described at some length in the Q-PAC binders bulletin which is put out by the Air Products Corp.

The high surface area valve metal powder is coated with polypropylene carbonate by tumbling the tantalum powder with a room temperature solution of polypropylene carbonate. Room temperature means temperatures between about 15° C. and about 30° C., preferably about 20° C.

Thereafter, the coated powder is statically dried to produce a semi-solid caked material. Statically dried means that the powder is not tumbled, agitated, shaken, or the like during drying. Instead the powder is placed on a surface and is allowed to dry simply by allowing the solvent to evaporate. Note that the surface the powder is placed on can move, e.g. a moving belt, but the particles remain static on the surface.

For example, the wet coated material is disposed on a slowly moving conveyor belt or rotating plate dryer and removed incrementally as the residual solvent is reduced to a suitably low level. This produces a more or less continuous but effectively static drying process (i.e., the valve metal powder is not agitated during the drying process). The semi-solid caked material is then sieved through a suitable screen. The screen size is between about 20 and about 50 mesh, preferably about 35 mesh. A preferred screen is stainless steel.

The temperature of the static drying is about 10° C. to about 100° C., preferably about 20° C. to about 30° C.. Preferably no heat is applied to the powder. Instead the drying is achieved by exposing the powder to ambient air.

The use of polypropylene carbonate has been found to give rise to post vacuum sintering residual carbon levels of below 150 ppm for 0.1 gram anodes fabricated from 0.4 to 0.5 square meter per gram tantalum powders. This residual carbon level is unexpectedly lower than the residual carbon level achieved when using traditional binders such as ACRAWAX C.

EXAMPLE

Approximately 10 pounds of Cabot, C-410 tantalum powder was coated with 2% polypropylene carbonate (based upon the weight of the tantalum) by tumbling the tantalum powder with the appropriate amount of a 10 wt. % solution of polypropylene carbonate in acetone. The powder was then dynamically dried (i.e., tumbled during drying) in a Patterson-Kelly V-shell blender, under vacuum to give Sample A.

Approximately 5 pounds of sample A was re-wet with acetone (approximately half as much as was used to wet the original 10 pounds of tantalum powder) with tumbling. The acetone-wet, polypropylene carbonate-coated tantalum was then placed in a pan to dry under a draft of air. The evaporation of the solvent left a semi-solid cake which was manually sieved through a 35 mesh, stainless steel screen, forming Sample B. A comparison of the properties of the two samples of tantalum powder, which contain the same amount of the same binder (polypropylene carbonate) is given in Table 1. Particle size was determined using an LA900 Horiba laser diffraction particle size analyzer.

TABLE 1

|  | Hall Flow Test | % of Particles <1.0 micron | Median Particle Size |
| --- | --- | --- | --- |
| Sample A | (no flow) | 6.6% | 30.3 microns |
| Sample B | 1.56 gm/sec | 0.9% | 106.2 microns |

Thus the Sample B binder-coated tantalum powder exhibited much-improved flow performance compared with the sample A powder. Although not wishing to be limited by any theory, it appears that this is due to the larger median particle size of the tantalum/binder agglomerates formed with static drying followed by screening as compared with dynamic drying.

The much reduced fines (<1.0 micron) content of the static-dried and sieved binder-coated tantalum powder was observed to give rise to significantly lower dust generation during the anode pressing process.

Subsequent batches that were simply wet once with polypropylene carbonate in acetone that were then statically dried performed in a manner similar to Sample B.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method of producing a high surface area valve metal powder coated with polypropylene carbonate comprising tumbling the valve metal powder in a solution of polypropylene carbonate in a suitable solvent to form a coated powder, statically drying the coated powder to evaporate the solvent, and then sieving the resulting dried powder.

2. The method of claim 1 wherein the valve metal powder is tantalum powder.

3. The method of claim 1 wherein the suitable solvent is acetone.

4. The method of claim 1 wherein the powder is dried on a moving belt or a rotating plate dryer.

5. The method of claim 1 wherein the concentration of the polypropylene carbonate in solution is about 0.5% to about 25% based on the total weight of the solution.

6. The method of claim 1 further comprising statically drying the coated powder by applying a draft of air across the powder.

7. The method of claim 1 wherein the drying occurs at a temperature between about 10° C. and 100° C.

8. The method of claim 7 wherein the drying occurs at a temperature between about 20° C. and 30° C.

9. The method of claim 1 further comprising sieving through a screen having the size of about 20 to about 50 mesh.

10. A method of producing powder metallurgy anode bodies comprising compacting a coated valve metal powder wherein the coated valve metal powder is prepared by tumbling the valve metal powder in a solution of polypropylene carbonate in a suitable solvent to form a coated powder, statically drying the coated powder to evaporate the solvent, and then sieving the resulting dried powder.

11. The method of claim 10 wherein the valve metal powder is tantalum powder.

12. The method of claim 10 wherein the suitable solvent is acetone.

13. The method of claim 10 wherein the concentration of the polypropylene carbonate in solution is about 0.5% to about 25% based on the total weight of the solution.

14. The method of claim 10 wherein the drying occurs at a temperature between about 10° C. and 100° C.

15. The method of claim 14 wherein the drying occurs at a temperature between about 20° C. and 30° C.

16. The method of claim 10 further comprising sieving through a screen having the size of about 20 to about 50 mesh.

17. A powder metallurgy anode body comprising a compacted coated valve metal powder wherein the coated valve metal powder is prepared by tumbling the valve metal powder in a solution of polypropylene carbonate in a suitable solvent to form a coated powder, statically drying the coated powder to evaporate the solvent, and then sieving the resulting dried powder.

18. The powder metallurgy anode body of claim 17 wherein the valve metal powder is tantalum powder.

19. The powder metallurgy anode body of claim 17 wherein the suitable solvent is acetone.

20. The powder metallurgy anode body of claim 17 wherein the concentration of the polypropylene carbonate in solution is about 1% to about 10% based on the total weight of the solution.

* * * * *